(12) United States Patent
Goodman

(10) Patent No.: US 9,475,146 B2
(45) Date of Patent: Oct. 25, 2016

(54) SOLDERING JIG AND METHOD

(71) Applicant: Farmer Mold & Machine Works, Inc., St. Petersburg, FL (US)

(72) Inventor: John Goodman, Valrico, FL (US)

(73) Assignee: Farmer Mold & Machine Works, Inc., St. Petersburg, FL (US)

( * ) Notice: Subject to any disclaimer, the term of this patent is extended or adjusted under 35 U.S.C. 154(b) by 0 days.

(21) Appl. No.: 14/427,530

(22) PCT Filed: Feb. 28, 2014

(86) PCT No.: PCT/US2014/019501
§ 371 (c)(1),
(2) Date: Mar. 11, 2015

(87) PCT Pub. No.: WO2014/134482
PCT Pub. Date: Sep. 4, 2014

(65) Prior Publication Data
US 2015/0352652 A1    Dec. 10, 2015

Related U.S. Application Data

(60) Provisional application No. 61/770,846, filed on Feb. 28, 2013.

(51) Int. Cl.
*B23K 31/02* (2006.01)
*B23K 37/04* (2006.01)
*B23K 1/00* (2006.01)
*B23K 3/08* (2006.01)

(52) U.S. Cl.
CPC ............ *B23K 1/0016* (2013.01); *B23K 3/087* (2013.01); *B23K 31/02* (2013.01); *B23K 37/0443* (2013.01)

(58) Field of Classification Search
None
See application file for complete search history.

(56) References Cited

U.S. PATENT DOCUMENTS

| | | | |
|---|---|---|---|
| 3,119,287 A | | 1/1964 | Roberts et al. |
| 3,474,521 A | * | 10/1969 | Schwenn ........... H01R 43/0256 228/180.21 |
| 3,479,729 A | * | 11/1969 | Britt ..................... B23K 1/0016 228/180.1 |
| 4,322,597 A | * | 3/1982 | Hooke .................. H01M 2/204 219/106 |
| 5,308,717 A | | 5/1994 | Gordin |
| 5,431,331 A | * | 7/1995 | Ney ....................... B23K 3/087 228/212 |
| 5,878,788 A | | 3/1999 | Gurry |
| 6,309,429 B1 | | 10/2001 | Lund et al. |
| 8,177,206 B2 | * | 5/2012 | Scheuerman ..... H01M 10/0413 269/43 |
| 9,005,791 B2 | * | 4/2015 | Kong ...................... H01M 2/00 219/117.1 |
| 2013/0029212 A1 | * | 1/2013 | Hong .................. H01M 2/0212 429/179 |
| 2014/0182925 A1 | * | 7/2014 | Jang ................... H05K 13/0023 174/382 |

FOREIGN PATENT DOCUMENTS

EP           1634669 A1 *  3/2006  ............... B21D 1/06
WO   WO 2009049573 A1 *  4/2009  ............... B23K 3/02

* cited by examiner

*Primary Examiner* — Kiley Stoner
(74) *Attorney, Agent, or Firm* — Christopher Paradies; Paradies Law P.A.

(57) ABSTRACT

A soldering jig comprises a shaped hole that fits a corresponding battery terminal, such as a square battery terminal, and provides a cavity for insertion of a solder wire. An opposite side from the cavity for insertion of the solder wire provides a blind hole for insertion of one end of the solder wire and a template for bending and cutting the solder wire to a correct length. Once cut, the solder wire is inserted into the cavity and is resiliently retained until the solder wire and jig are inverted and placed onto a hot battery terminal. Under pressure and residual heat the hot battery terminal, the solder wire melts, soldering an interface.

13 Claims, 1 Drawing Sheet

SOLDERING JIG AND METHOD

CROSS RELATED APPLICATIONS

This application is a 371 of International Application No. PCT/US2014/019501 filed Feb. 28, 2014 which claims priority to U.S. Provisional Application No. 61/770,846, entitled Soldering Jig and Method, filed Feb. 28, 2013.

FIELD OF THE INVENTION

The field relates to battery post soldering methods.

BACKGROUND

Battery posts are soldered or welded to electrodes that extend into the compartment of a battery. The electrodes may be plates or other forms of materials that conduct electricity generated or stored in the battery to the posts. For example, in batteries contained within a case, the posts are the only electrical elements, except for test points, if applicable, that extend from the case. Particularly for battery cases containing corrosives or liquids, it is important to seal the electrochemical compositions that store and deliver electricity within the battery. Thus, the posts must be electrically connected with electrodes that make contact with such electrochemical compositions, and the interface between the case and the posts must provide a seal where the posts extend through the case.

In addition, it is important for the interface between the posts and the electrodes within the battery to be capable of withstanding the temperatures and chemical environments present within the case at the junction between the posts and the electrodes, unless the posts and electrodes are integrally fabricated, being made of a single material that is neither welded or joined in any other manner.

Posts and electrodes are known that are joined by welding, brazing or soldering. In addition, some processes require a joint or interface to be brazed or soldered and to have a particular shape to the joint or interface between the posts and electrodes of a battery.

SUMMARY

A post soldering jig is comprised of a durable, heat-resistant plastic, such as a phenolic. For example, a G 10 phenolic may be machined to provide an axial, through-hole in the jig. The jig may be made of a rod, such as a round or square rod of the durable, heat-resistant plastic. A through-hole may be formed, such as by machining, along a central, longitudinal axis of the rod, such that the rod may be placed over a battery post for soldering or brazing of the battery post after the post is welded or otherwise joined to an electrode of a battery (i.e. a postwelding soldering of a battery/electrode junction). Such a post-welding soldering or brazing may be necessary to provide a particular fillet between the post and the electrode or for other reasons.

On one end of the jig, a recessed portion receives a solder or brazing material, such as elongated solder or braze having a circular cross section, which is commonly available, The particular choice for the solder or braze depends on the requirements for the post-welding soldering or brazing operation, and the solder or braze composition may be selected from well known compositions to achieve desired results. The claims use solder and solder wire for both solder and braze.

For example, a solder wire of containing lead (Pb) and Tin (Sn) may be used for post welding soldering of a lead post and electrode for use in a lead-acid battery. Preferably, the Pb—Sn solder contains a ratio of Pb to Sn to allow the solder to melt when applied to a battery post, without further heating other than the residual temperature from forming of the battery post within a battery terminal for a lead-acid battery, such as by a casting or welding process.

The recessed portion of a jig may provide a depth and shape capable of providing a gauge of solder wire good contact between the wire and the junction between the post and the electrode, wherein the gauge of solder is selected to provide a solder joint on a transition between a battery post and the remainder of the terminal that extends into the body of the battery housing. A preheated post and electrode may be contacted by the solder wire by placing the solder wire within the recessed portion, which is shaped to accommodate the solder wire and to place it in contact around the periphery of the post-electrode interface. For example, the recessed portion may have a depth slightly less than the thickness of the solder wire and may form a square recess around a square through-hole, which is sized to engage the post-electrode interface in contact with the solder wire when the solder wire is inserted in to the recess and the jig is placed over the post and is forced down onto the post-electrode interface. If the post and electrode are preheated, at least at the interface, to a temperature above the melting temperature of the solder, then the solder wire will soften and melt forming a molten fillet at the post electrode interface.

An opposite end of the jig may be provided with a shaping tool for shaping of the solder wire to fit the recessed portion of the jig. In this way, a jig may be used to shape one or more solder wires for use in the recessed portion of the jig.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

Figure 1:
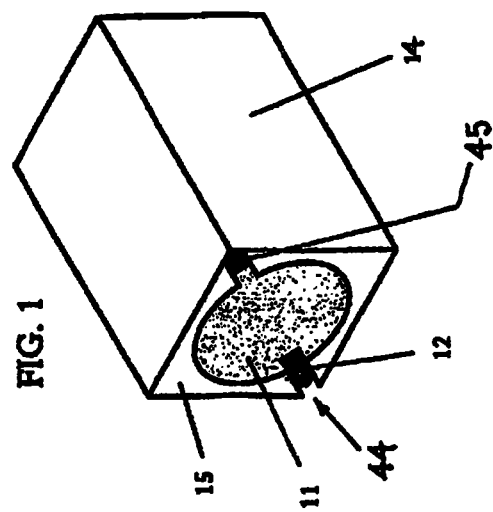
FIG. 1 illustrates a perspective view illustrating one end of a jig.

The examples provided are illustrative of the invention and are not intended to be limiting to the claims that eventually issue. FIG. 1 illustrates a perspective view of one end 15 of a jig 14. The end shown is a square having sides 1.25 inches long. The jig extends 2 inches between the end shown 15 and an opposite end 16.

Figure 4:
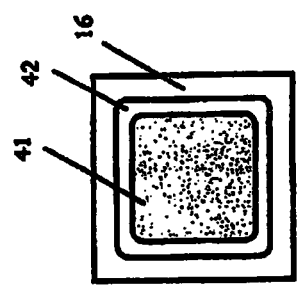
FIG. 4 illustrates an end plan view of the opposite end of the jig from the recessed portion.
Figure 2:
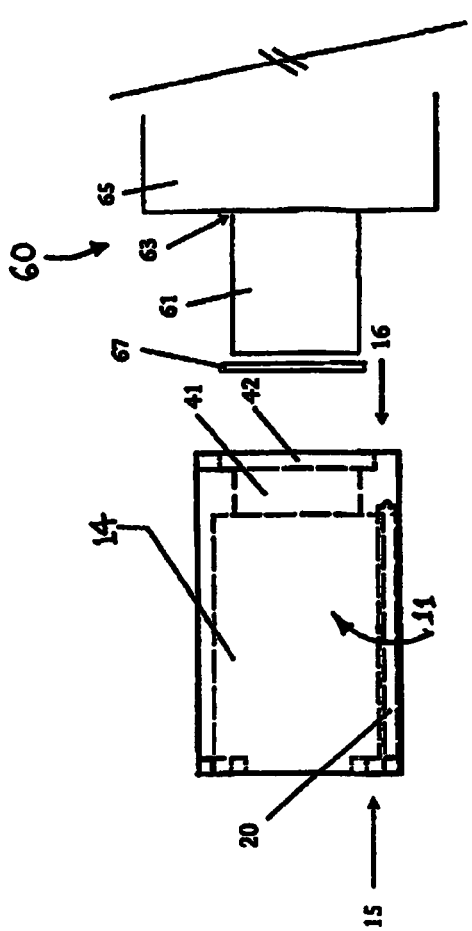
FIG. 2 illustrates an exploded side plan view of a jig with dashed lines indicating hidden lines, a solder wire bent for inserting into the jig and a battery post.
Figure 5:
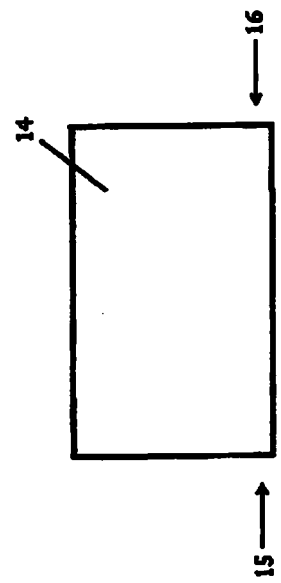
FIG. 5 illustrates a side plan view of a jig without showing any hidden lines.

As best illustrated by the hidden lines of FIG. 2, the jig incorporates a blind hole 20 extending 1.67 inches deep into the block forming the jig from the end 15 shown in FIGS. 1 and 4. The blind hole diameter may be 0.11 inches, accommodating a solder wire having a diameter from 0.1 inches to 0.11 inches, for example.

For example, a solder wire having a diameter of about 0.105 inches, plus or minus 0.005 inches, is inserted into the blind hole 20 until the end of the solder wire reaches the end of the blind hole 20. Then, the solder wire is bent diagonally across the jig to the opposite corner 44, the solder wire coming to rest in the channel 12 formed in the opposite corner 44. A solder wire cutter snips the solder wire adjacent to the corner providing a wire length suitable for use in a subsequent step in the process. Then, the snipped solder wire is removed from the hole 20.

Figure 3:
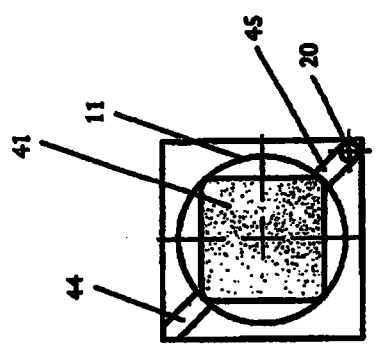
FIG. 3 illustrates an end plan view of a jig showing a recessed portion for inserting of a solder wire containing a core of flux having an outer diameter greater than 0.1 inches.

The jig 14 may be reversed to the end 16 opposite of the end 15 shown in FIG. 1, which has a recessed portion 42 best illustrated in FIGS. 2 and 3. Specifically, the recessed portion 42 may be about 0.1 inches deep and may form a square having sides 0.96 inches long. A square through-hole 41 may be formed in the jig having a length and width of 0.77 inches, which is selected to accommodate a square battery post electrode, such that the jig is capable of sliding over the battery post electrode of a lead acid battery, for example.

The snipped solder wire may be inserted into the square recessed portion 42 on the end 16 of the jig shown in FIG. 3. The elbow in the solder wire formed by bending in the previous step may be inserted in one of the four corners of the recessed portion 42, and the solder wire may be bent at each of the other corners to conform to the square shape of the recessed portion 42, for example. Alternatively, one end of a snipped solder wire may be inserted into a corner, and the solder wire 67 may be bent at each of the remaining three corners such that the opposite end of the wire comes to rest adjacent to the end of the solder wire inserted into the corner. Either way, the snipped solder wire 67 fits into the recessed portion 42.

Preferably, the solder wire is resiliency retained in the recessed portion. For example, opposite ends of the solder wire may be separated by a small distance prior to inserting the solder wire into the recessed portion 42 and placed on a battery post. If resiliency retained in the recessed portion 42, then the end of the jig retaining the solder wire may be inverted and may be placed on a battery post electrode 61 and the solder wire does not fall out of the recessed portion of the jig during inversion. In this way, a jig may be placed over the end of the battery post electrode 61 and the solder wire may be placed into contact with a transition 63 between the battery post electrode 61 and the remainder of the battery post 65, where the battery post electrode 61 extends outwards, above the remainder of the battery post 65.

When the battery post 60 is hot after joining of the battery post electrode 61 within the remainder of the battery post 65, the jig, having a solder wire resiliency retained within the recessed portion of the jig, may be guided over the battery post electrode 61 such that the battery post electrode 61 is inserted through the square hole 41. The solder wire 67 is placed into contact with the transition 63 between the battery post electrode 61 and the remainder of the battery post 65, the solder wire melts due to the residual heat of the battery post 60 and a good solder joint is formed by pressing the jig onto the battery post and allowing it to stay in position until the solder wire melts and resolidifies, for example.

As a result, no manual soldering of the transition between the battery post electrode and the remainder of the battery post is required and a highly consistent, quality solder joint is formed at the transition 63. A post soldering jig for soldering a joint between a battery post and a battery terminal comprises a durable, heat-resistant material forming a jig body 14. A shaped hole 11 is capable of accommodating a battery post, such that the jig body 14 fits over the battery post 60 when the battery post is inserted into the shaped hole, as illustrated in FIG. 2, for example. A first end 16 of the jig body 14 having a recessed portion 42, the recessed portion being disposed around the shaped hole 11 and having a depth and perimeter length capable of receiving a wire 67 having a wire diameter and a wire length, such that the wire makes good contact with the joint between the battery post and the battery terminal. A second end 15, opposite of the first end 16, has a blind hole 20 and a guide 44 disposed at a distance from the blind hole, the blind hole having a depth and a diameter capable of accommodating the wire, wherein the depth of the blind hole and the distance from the blind hole to the guide 44 provides the wire length, the wire length being selected such that the wire fits around the perimeter length, and the wire forms a continuous bead around the battery post at the joint between the battery post and the battery terminal, when the jig is used for soldering the joint between the battery post and the battery terminal. The guide 44 further comprises a second channel 45 formed in a second side of the second end 15 of the jig body 14 opposite of the first side of the second end 15.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A post soldering jig for soldering a joint between a battery post and a battery terminal comprises:
    a durable, heat-resistant material forming a jig body;
    a shaped hole capable of accommodating the battery post, such that the jig body fits over the battery post when the battery post is inserted into the shaped hole;
    a first end of the jig body having a recessed portion, the recessed portion being disposed around the shaped hole and having a depth and perimeter length capable of receiving a wire having a wire diameter and a wire length, such that the wire makes good contact with the joint between the battery post and the battery terminal;
    a second end, opposite of the first end, the second end having a blind hole and a guide disposed at a distance from the blind hole, the blind hole having a depth and a diameter capable of accommodating the wire, wherein the depth of the blind hole and the distance from the blind hole to the guide provides the wire length, the wire length being selected such that the wire fits around the perimeter length, and the wire forms a continuous bead around the battery post at the joint between the battery post and the battery terminal, when the jig is used for soldering the joint between the battery post and the battery terminal.

2. The jig of claim 1, wherein the guide comprises a first channel having channel sides and a channel bottom formed in a first side of the second end and the blind hole extends downwardly into the jig body from a portion of the channel bottom.

3. The jig of claim 2, wherein the guide further comprises a second channel formed in a second side of the second end of the jig body, opposite of the first side of the second end.

4. The jig of claim 3, wherein an outer perimeter of the second end comprises a quadrilateral.

5. The jig of claim 4, wherein the first side is disposed at one vertex of the quadrilateral and the second side is disposed at an opposite vertex of the quadrilateral from the first side.

6. The jig of claim 5, wherein the quadrilateral is a square.

7. The jig of claim 1, wherein a portion of the shaped hole comprises a square cross section.

8. The jig of claim 7, wherein a round hole extends from the portion of the shaped hole that comprises a square cross section through the remainder of the jig body, such that the shaped hole is a through hole.

9. The jig of claim 1, wherein the jig body is comprised of a phenolic.

10. A method for using the jig of claim 1, the method comprising:
   inserting one end of a wire for soldering into the blind hole to the depth of the blind hole;
   bending the wire such that a bend is formed where the wire exits the blind hole;
   extending the wire from the blind hole to a guide, measuring a wire length;
   cutting the wire at the guide such that the wire has the wire length;
   reversing the jig body;
   inserting the wire into the recessed portion of the first end around the shaped hole, such that the wire diameter extends a distance above the surface of the first end and around the perimeter length;
   positioning the first end of the jig body over the battery post;
   inserting the battery post into the shaped hole, such that the wire makes contact with the joint between the battery post and the battery terminal; and
   forming solder around the joint between the battery post and the battery terminal.

11. The method of claim 10, wherein the solder provides a fillet at the joint.

12. The method of claim 10, further comprising preheating the battery post and the battery terminal.

13. The method of claim 10, further comprising shaping the wire, after the step of cutting the wire, into a square by removing the wire from the blind hole and using the jig to bend the wire into a square shape.

* * * * *